United States Patent
So et al.

(10) Patent No.: US 9,213,399 B2
(45) Date of Patent: *Dec. 15, 2015

(54) BIOS CONTROLLED PERIPHERAL DEVICE PORT POWER

(71) Applicant: HEWLETT-PACKARD DEVELOPMENT COMPANY, L.P., Houston, TX (US)

(72) Inventors: Chi So, Spring, TX (US); Binh T. Truong, Houston, TX (US); Luke Mulcahy, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/537,582

(22) Filed: Nov. 10, 2014

(65) Prior Publication Data

US 2015/0067373 A1     Mar. 5, 2015

Related U.S. Application Data

(63) Continuation of application No. 13/148,554, filed as application No. PCT/US2009/033541 on Feb. 9, 2009, now Pat. No. 8,914,649.

(51) Int. Cl.
*G06F 1/26*     (2006.01)
*G06F 1/32*     (2006.01)
*G06F 1/30*     (2006.01)

(52) U.S. Cl.
CPC ............... *G06F 1/325* (2013.01); *G06F 1/266* (2013.01); *G06F 1/3203* (2013.01); *G06F 1/3296* (2013.01); *G06F 1/30* (2013.01); *G06F 1/3243* (2013.01); *G06F 1/3287* (2013.01); *G06F 1/3293* (2013.01)

(58) Field of Classification Search
CPC ......... G06F 1/266; G06F 1/30; G06F 1/3203; G06F 1/3243; G06F 1/325; G06F 1/3287; G06F 1/3293
USPC .................................. 713/300, 320, 323, 324
See application file for complete search history.

(56) References Cited

U.S. PATENT DOCUMENTS

| 6,122,749 A | 9/2000 | Gulick |
| 6,125,449 A | 9/2000 | Taylor et al. |

(Continued)

FOREIGN PATENT DOCUMENTS

| JP | 2006053748 | 2/2006 |
| KR | 10-20080060045 | 7/2008 |

OTHER PUBLICATIONS

ISA/KR, International Search Report, dated Oct. 23, 2009, WO2010/090646, published Aug. 12, 2010, PCT/US2009/033541 filed Feb. 9, 2009.

*Primary Examiner* — Michael J Brown
(74) *Attorney, Agent, or Firm* — Van Cott, Bagley, Cornwall & McCarthy

(57) ABSTRACT

A BIOS controlled peripheral device port power device is described. The device includes a processor and at least one peripheral device port. The processor powers up a host controller in preparation for the processor to enter a sleep state. The processor also places the processor in the sleep state after the host controller is powered up. The processor also selectively powers the at least one peripheral device port by the host controller when the processor is in the sleep state according to at least one setting stored in the processor.

20 Claims, 7 Drawing Sheets

(56) References Cited

U.S. PATENT DOCUMENTS

| | | |
|---|---|---|
| 6,230,277 B1 | 5/2001 | Nakaoka et al. |
| 6,665,801 B1 | 12/2003 | Weiss |
| 8,914,649 B2 * | 12/2014 | So et al. .................. 713/300 |
| 2007/0067659 A1 | 3/2007 | Tevanian, Jr. |
| 2007/0220290 A1 | 9/2007 | Tsai |
| 2008/0148083 A1 | 6/2008 | Pesavento et al. |
| 2009/0063877 A1 | 3/2009 | Lewis et al. |

* cited by examiner

BIOS CONTROLLED PERIPHERAL DEVICE PORT POWER

RELATED DOCUMENTS

The present application is a continuation and claims the benefit under 35 U.S.C. §120, of U.S. Application Publication Ser. No. 13/148,554, filed Aug. 9, 2011, which is the National Stage of International Application No. PCT/US2009/033541 filed on Feb. 9, 2009. These applications are herein incorporated by reference in their entirety.

BACKGROUND

Many computer systems have peripheral ports configured to connect to and interface with peripheral devices. A large portion of such ports implement the Universal Serial Bus (USB) standard. The physical interface specifications of the USB standard allow for a variety of peripheral devices to be connected to a computer using a simple, standardized socket. Hardware peripheral devices that typically use USB or similar peripheral ports include, but are not limited to, external hard drives, keyboards, mice, wireless network adapters, scanners, printers, and the like. USB peripheral ports are typically managed by a host controller, a hardware device that serves as an interface between a computing device and the peripheral devices connected to the USB ports of the computing device. In addition to managing the flow of data between the host computing device and the peripheral devices, the host controller also provides electrical power from the computing device's power supply to the peripheral devices via the USB ports.

One particular advantage of the USB standardization is that it provides for some devices to be powered directly from a USB port. With the increasing ubiquity of the USB standard in modern computing devices, it has become increasingly common for peripheral devices, particularly small battery-powered peripheral devices, to rely on a peripheral device port, such as a USB port, in a host computing device as a principle source of electrical power instead of or in addition to a separate power supply.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As described above, some peripheral devices draw power from a host computing device's power supply directly through a peripheral USB port, thereby negating the need for a separate, individual power supply for each peripheral device. However, in certain scenarios it may be desirable to provide power to such a peripheral device through the USB port even when the computing device itself is powered down in a sleep state.

To accomplish the above and other goals, the present specification discloses systems and methods for selectively powering peripheral devices through peripheral device ports of a processor when the processor is in a sleep state. This is accomplished by the processor being configured to selectively power at least one peripheral device port when in the sleep state in accordance with at least one setting stored by the firmware of the processor. For example, the setting may be stored in the Basic Input Output System firmware for the processor. A user may alter the setting stored by the firmware of the processor to enable or disable powering of one or more elements of the peripheral device port subsystem while the processor is in a sleep state. By choosing to enable powering to one or more elements in the peripheral device port subsystem during sleep states of the processor, peripheral devices powered through the peripheral device ports of the processor may continue to operate in spite of the sleep state of the processor, thereby allowing the processor to reduce its power consumption when idle. Furthermore, by choosing to disable power to the peripheral device port subsystem entirely during the processor sleep states, important energy resources may be conserved.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1:
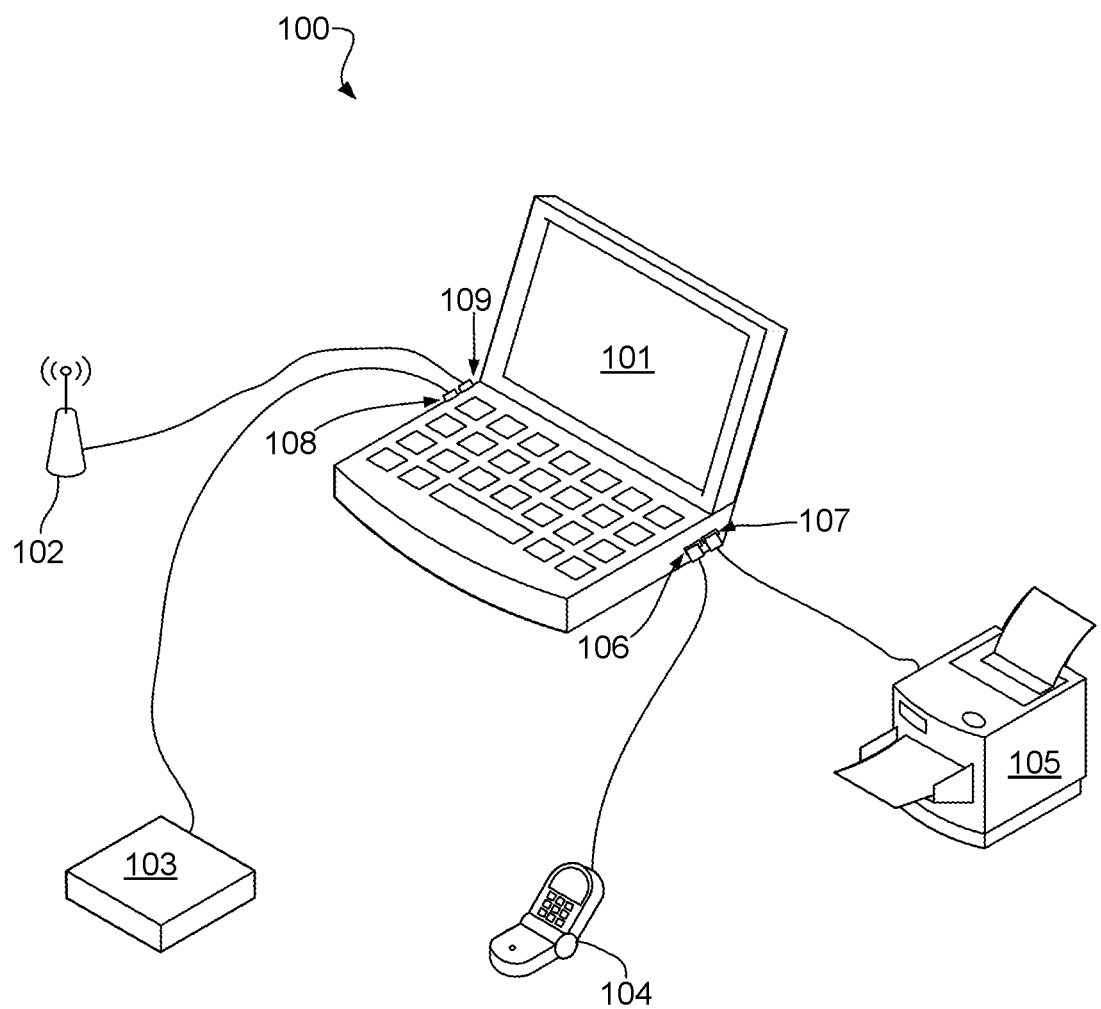
FIG. 1 is a diagram of an illustrative computing system in which peripheral devices interface with a computing device through peripheral device ports, according to one exemplary embodiment of the principles described herein.

FIG. 1 is a diagram of an illustrative computing system (100) having a computing device (101) that interfaces with several external peripheral devices (102, 103, 104, 105) through peripheral device ports (106, 107, 108, 109) such as USB ports. The peripheral devices (102, 103, 104, 105) of the present example include a wireless network adapter (102), an external hard drive (103), a cell phone (104), and a printing device (105). Each of these peripheral devices (102, 103, 104, 105) may utilize the peripheral device ports (106, 107) of the computing device (101) to transmit data to and receive data from the computing device (101). Certain of the peripheral devices (102, 103, 104, 105) may be powered by their own external power supplies while other peripheral devices (102, 103, 104, 105) may rely on the peripheral device ports (106, 107, 108, 109) of the computing device (101) to supply power. Typically smaller peripheral devices (102, 103, 104, 105) such as flash storage devices, mobile phones, PDAs, media players, and the like rely on the peripheral device ports (106, 107, 108, 109) to which they are connected for electrical power.

It will be readily apparent to one of ordinary skill in the art that the external peripheral devices (102, 103, 104, 105) shown in FIG. 1 are merely exemplary of the types of peripheral devices that may interface with a computing device (101) and are in no way to be construed as limiting the scope of the present specification. Any other peripheral device that may suit a particular application of the principles described herein may be used in addition to or in substitution for any one or more of the external peripheral devices (102, 103, 104, 105) shown.

Many times it is necessary to have peripheral devices (102, 103, 104, 105) powered even when a processor of the computing device (101) is in a sleep state. The present specification discloses solutions implemented on the firmware level for powering peripheral device ports (106, 107, 108, 109) such as USB ports during a processor sleep state so that peripheral devices (102, 103, 104, 105) may continue to draw power from the ports (106, 107, 108, 109).

When a processor in a computing device (101) boots up, most systems allow a user to press a key or combination of keys that will allow the user to enter a setup menu for the BIOS (Basic Input Output System) firmware of the system. The BIOS firmware is a basic operating system that initializes important hardware devices such as the hard drive, video display adapter, and other devices when the computer is first powered on. Among other purposes, the BIOS firmware prepares the processor to allow more comprehensive, higher level, operating systems such as Windows or Linux to be loaded, executed, and given control of the processor and computing device (101) as a whole. Thus, a menu option system in the BIOS setup menu may be provided to allow the user to either enable or disable power to one or more peripheral device ports (106, 107, 108, 109) when the processor (101) of the computing device enters a sleep state.

Figure 2:
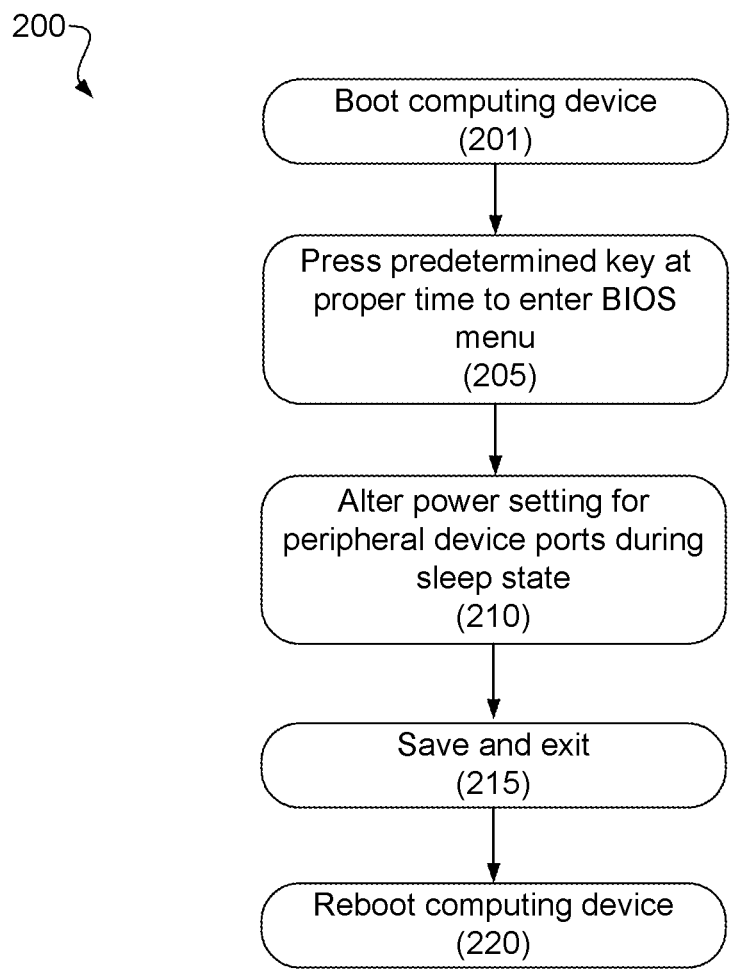
FIG. 2 is a flow diagram of an illustrative method of setting a user-alterable peripheral device port power setting in a system BIOS menu, according to one exemplary embodiment of the principles described herein.

Referring now to FIG. 2, a flow diagram of an illustrative method (200) of selectively altering a peripheral device port power setting in a system BIOS menu is shown. A user must typically boot (step 201) the computing device and then press (step 205) a predetermined key or combination of keys within a given time window to enter the BIOS setup menu directly or a preliminary menu through which the BIOS setup screen may be accessed. In many current personal computing devices, the predetermined key to enter the BIOS setup menu is F10, however the actual key used may vary across different platforms and systems and is immaterial to the present method (200).

The BIOS setup menu may include a number of settings within different categories that the user may selectively alter. One of these options may include one or more settings relating to the powering of peripheral device ports when the processor of the computing device is in a sleep state. The user may then alter (step 210) the desired power setting for peripheral device ports during the sleep state by inputting a desired setting to the computing device using the BIOS menu. After the BIOS settings have been saved and the user exits the BIOS menu (step 215), the computing device may reboot (220) with the new settings defined by the user in place.

Additionally or alternatively, the power setting for peripheral device ports during the sleep state may be altered through a higher level operating system such as Windows or Linux. These operating systems typically have means for allowing users to access and alter various hardware settings. In a possible embodiment, the user could make these changes without having to go through an initial BIOS menu. Thus, in certain embodiments a user may be able to access and alter the powered peripheral device BIOS settings through a control panel in a WINDOWS, MACINTOSH, or UNIX operating system.

The exact means of altering the power setting(s) for the peripheral device ports during the sleep state is not material to the present disclosure, and any method that suits a particular application of the principles described herein may therefore be used.

Additionally, many host computing devices include a plurality of powered peripheral device ports. For example, a computer may include two or more USB ports. Therefore, in certain embodiments, the user-alterable BIOS setting(s) for peripheral device port powering may allow a user to specify which (if any) of all the plurality of powered peripheral device ports he or she desires to remain powered while the processor of the computing device is in a sleep state. Such options may give the user greater flexibility in power management. These additional options may also be set in a system BIOS menu at startup and/or in a higher level operating system.

Figure 3:
FIG. 3 is a diagram of various illustrative sleep states of a computing device, according to one exemplary embodiment of the principles described herein.

Referring now to FIG. 3, a diagram is shown of the standard power management states for the processor of a computing device as defined by the Advanced Configuration and Power Interface (ACPI) standard. The G0 category includes only one state, S0 (301), in which the processor is in its standard working mode wherein no sleep state is initiated. Category G1 includes sleep states S1 (302) through S4 (305). When a processor is in sleep state S1 (302), all processor caches are flushed and the CPU(s) stop executing instructions. The CPU(s) in the processor remains powered in an S1 sleep state (302), but other devices that are idle may be powered down. In sleep state S2 (303), the CPU is powered down. Sleep state S3 (304) is commonly referred to as standby or sleep, where most devices in the system along with the processor have been powered down, but the RAM remains powered. Sleep state S4 (305) is commonly referred to as hibernation. During hibernation, all content from the main memory or RAM is saved to non-volatile memory, such as on a hard drive. The RAM may then be powered down. When the computer awakens from the S4 state (305), the RAM contents that were saved on the hard drive are restored to the RAM. During category G2, which includes sleep state S5 (306), almost all devices in the system along with the processor are turned off. However, the processor may be awakened by certain detected peripheral inputs, such as a touch of the keyboard, mouse, or any other peripheral device that can be set to wake the computer. The final category G3 includes an "Off" state (307), also referred to as mechanical off. Typically, the only component of a system that remains powered in the "Off" state (307) is a real-time clock which is powered by its own small battery.

The act of a processor transitioning downward through these states (301, 302, 303, 304, 305, 306, 307), it is typically referred to as going into a deeper sleep. Therefore, throughout this document, the phrase "going into a deeper sleep" or any discussion regarding the depth of a sleep state refers to a progression through the "S" states described in reference to FIG. 3.

In certain embodiments, if a user has chosen to enable power to the peripheral device ports during a processor sleep state (302, 303, 304, 305, 306), an additional user-alterable BIOS setting may permit the user to specify for which sleep states (302, 303, 304, 305, 306) the peripheral device ports are to remain powered. For example, the user could select to only power the peripheral device ports for sleep states S1-S4 (302-305). In such a case, if the processor were in sleep state S4 (305), the peripheral device ports would remain powered. However, if the processor were to then transition to sleep state S5 (306), power to the peripheral device ports would be cut off. Alternatively, the user may elect to allow power to the peripheral device ports in all sleep mode states (S1-S5) (302, 303, 304, 305, 306). The BIOS setting specifying the maximum sleep state for which power will be supplied to each of the peripheral device ports may be set by the user through the system BIOS menu and/or the main operating system.

In some embodiments, a user may also specify a different maximum sleep state for one or more individual peripheral device port. For example, the user may desire that a first peripheral device port be powered in a maximum sleep state of S4 (305), while the remaining ports are to remain powered in state S5 (306).

Figure 4:
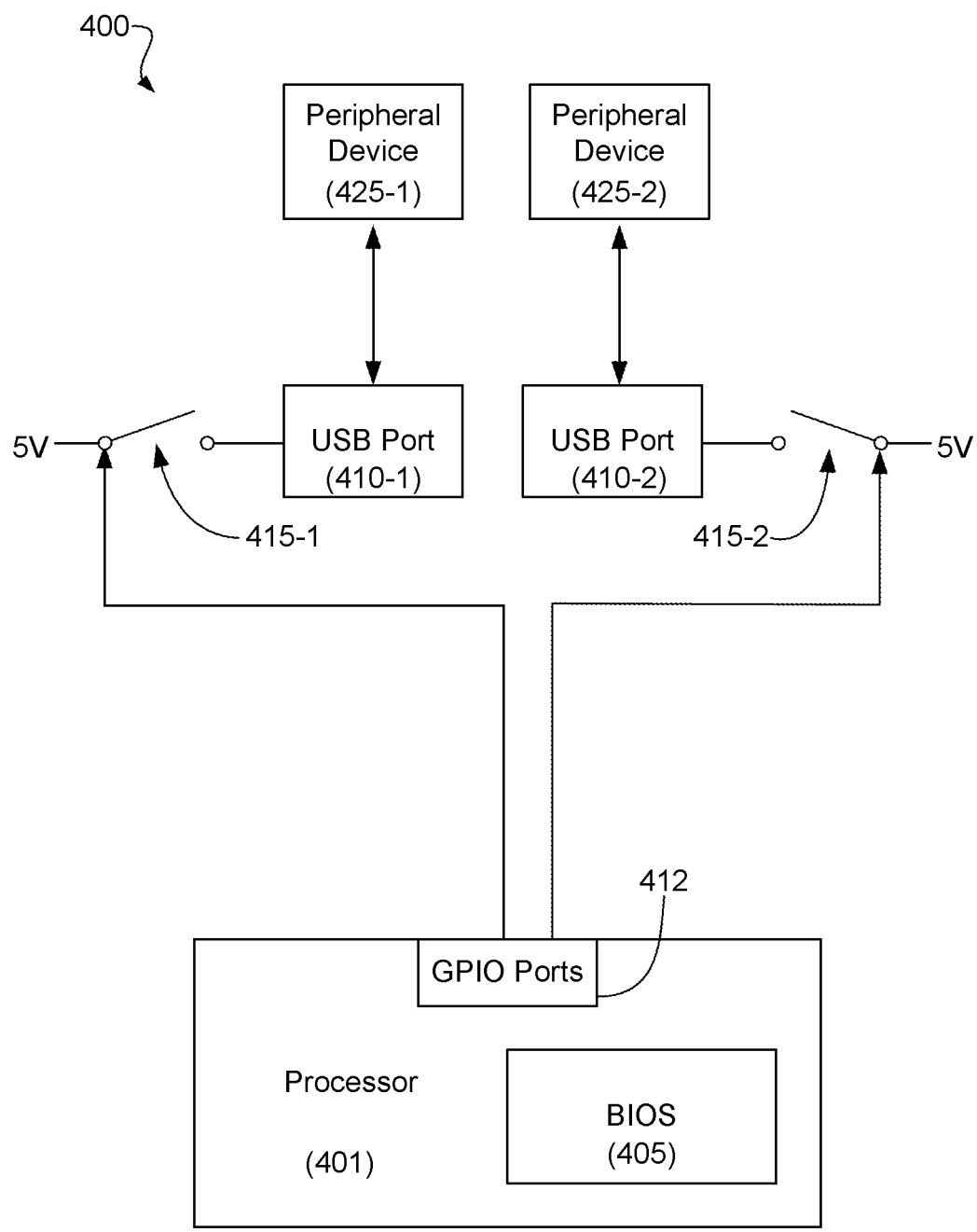
FIG. 4 is a block diagram of an illustrative system of peripheral port power control in a computing device, according to one exemplary embodiment of the principles described herein.

FIG. 4 is a block diagram of an illustrative computing device (400) configured to manage peripheral port power control. In the computing device (400), a processor (401) is configured to execute firmware BIOS (405) that stores one or more user-alterable settings for selectively enabling power to a plurality of peripheral device ports (410-1, 410-2), consistent with the principles described above. In the present example, the peripheral device ports (410-1, 410-2) are USB ports; however, any other suitable powered peripheral device port may be used in accordance with the principles described herein.

The processor (401) includes a plurality of general purpose input/output (GPIO) ports (412) that may be communicatively coupled to the control nodes of hardware switches (415-1, 415-2). As such, each of the hardware switches (415-1, 415-2) may be configured to open or close dependent on a digital signal received from a GPIO port (412) in the processor (401). Each of the hardware switches (415-1, 415-2) may be disposed between a corresponding peripheral device port (410-1, 410-2) and its power supply. The power supply may be from a USB host controller (not shown) that interfaces with the processor (401) and has a default setting of always providing power to the peripheral device ports (410-1, 410-2). Thus, depending on the signal from the associated GPIO ports (412) of the processor (401), power may be selectively enabled or disabled to the peripheral device ports (410-1, 410-2). The signals provided by the GPIO ports (412) to the hardware switches (415-1, 415-2) may be determined by the aforementioned user-alterable setting(s) stored by the BIOS (405) of the processor (401). Digitally controlled hardware switches are well-known in the art, and any such switch may be used that best suits a particular application.

In certain embodiments, the GPIO ports (412) may continue to provide a digital signal to the switches (415-1, 415-2) when the processor (401) has entered a sleep state. Additionally or alternatively, the switches (415-1, 415-2) may be configured to retain a state (i.e., open or closed) set by the GPIO (412) ports and only require another signal from the GPIO ports (412) when being toggled to another state.

Figure 5:
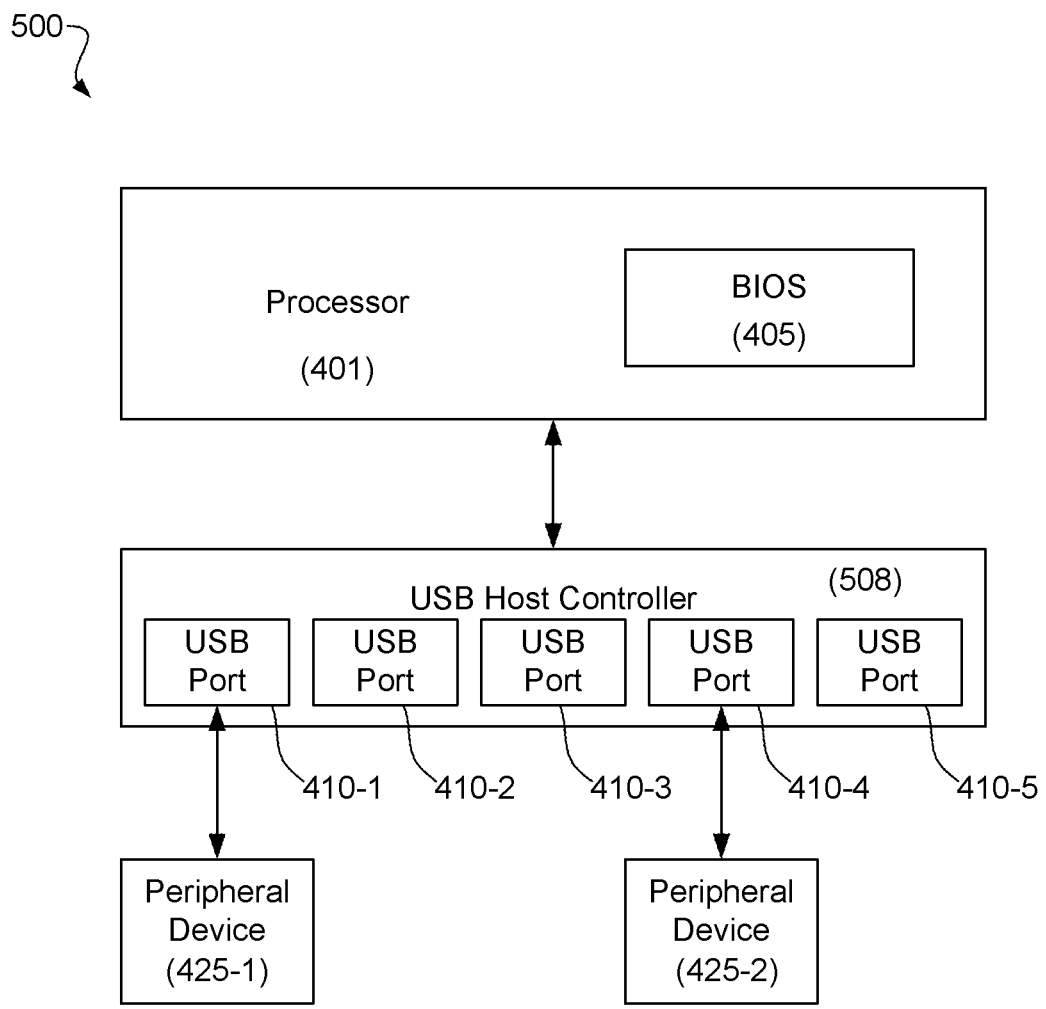
FIG. 5 is a block diagram of an illustrative system of peripheral port power control in a computing device, according to one exemplary embodiment of the principles described herein.

Referring now to FIG. 5, a block diagram is shown of another embodiment of an illustrative computing device (500) incorporating peripheral port power control. The illustrative computing device (500) includes a processor (401) configured to execute firmware BIOS (405) that stores one or more user-alterable settings for selectively enabling power to a plurality of peripheral device ports (410-1 to 410-5), consistent with the principles described above.

The processor (401) is communicatively coupled to a host controller (408) which controls the peripheral device ports (410-1 to 410-5) and serves as a physical and software or logical bridge between the processor (401) and the peripheral device ports (410-1 to 410-5). In the present computing device (500), when the processor (401) is entering a sleep state, the BIOS (405) may wake the host controller (508) after an operating system has been unloaded from the processor (401). The BIOS (405) may then set a port power bit in the host controller (508) for each peripheral device port (410-1 to 410-5) that needs to be powered during the sleep state according to the aforementioned user-alterable settings stored by the BIOS (405).

Figure 6:
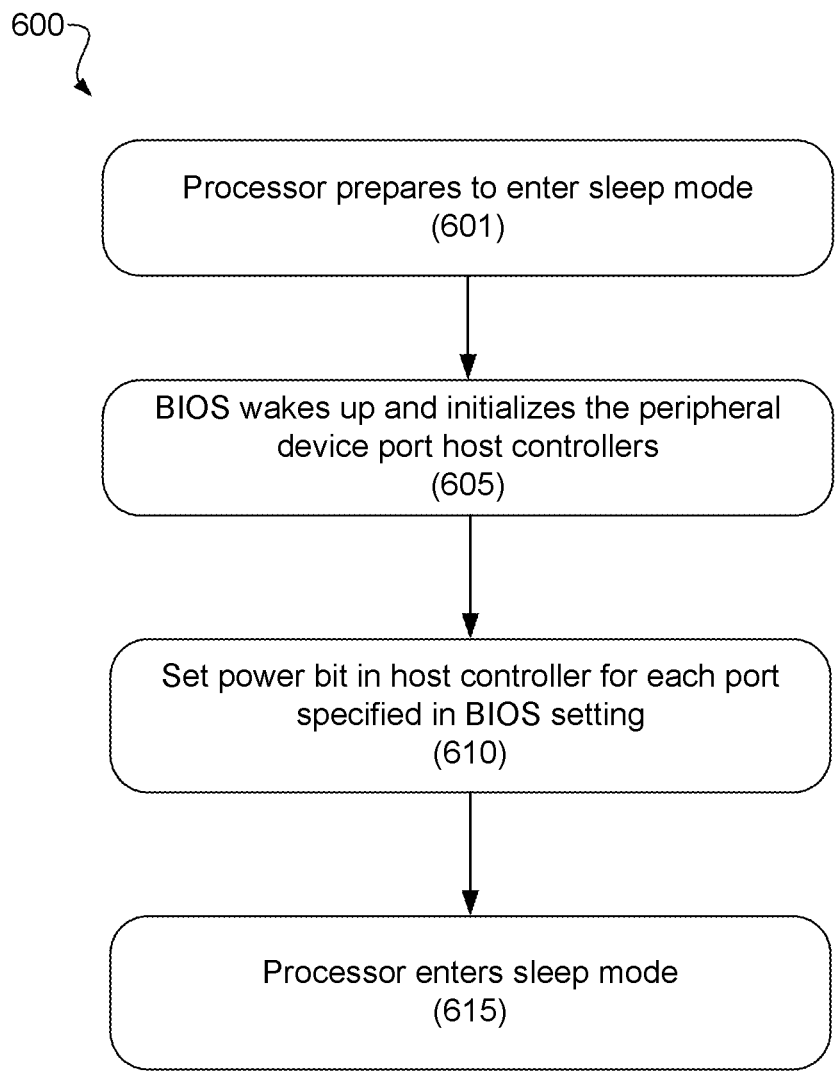
FIG. 6 is a flow diagram of an illustrative method of selectively powering peripheral device ports while a processor is in a sleep state, according to one exemplary embodiment of the principles described herein.

Referring now to FIG. 6, a flow diagram is shown of an illustrative method (600) of selectively powering peripheral device ports when a processor has entered a sleep state. The method (600) may be performed, for example, by the computing device (500, FIG. 5) described with respect to FIG. 5.

In certain embodiments, once a processor (401, FIG. 5) is entering a sleep state, the processor (401, FIG. 5) may unload the current operating system from system memory such that the processor (401, FIG. 5) is only executing its BIOS firmware (405, FIG. 5). In the present method (600), as the processor (401, FIG. 5) prepares (step 601) to enter a sleep mode and after the BIOS (405, FIG. 5) has unloaded the operating system from the processor (401, FIG. 5), the BIOS (405, FIG. 5) may wake up (step 605) and initialize the peripheral device host controller (508, FIG. 5).

The host controller (508, FIG. 5) may maintain one or more data registers configured to store bits corresponding to each peripheral device port (410-1 to 410-5, FIG. 5), wherein the stored value of each bit is determinative of whether its associated peripheral device port (410-1 to 410-5, FIG. 5) will remain powered by the host controller (508, FIG. 5). Accordingly, in the present method (600), the BIOS of the processor (401, FIG. 5) may set (step 610) the power bit in the host controller (508, FIG. 5) for each peripheral device port (410-1 to 410-5) specified to remain powered in a user-alterable BIOS setting, as described above.

In certain embodiments, the user-alterable BIOS setting may simply specify whether all of the peripheral device ports (410-1 to 410-5, FIG. 5) are to remain powered during the sleep state of the processor (401, FIG. 5). Alternatively, the user-alterable BIOS setting may specify whether individual peripheral device ports (410-1 to 410-5, FIG. 5) are to remain powered during the sleep state. Once the appropriate power bits have been set in the host controller, the processor may enter (step 615) a sleep mode while some, all, or none of the peripheral device ports (410-1 to 410-5, FIG. 5) remain powered according to the user-alterable BIOS setting.

Figure 7:
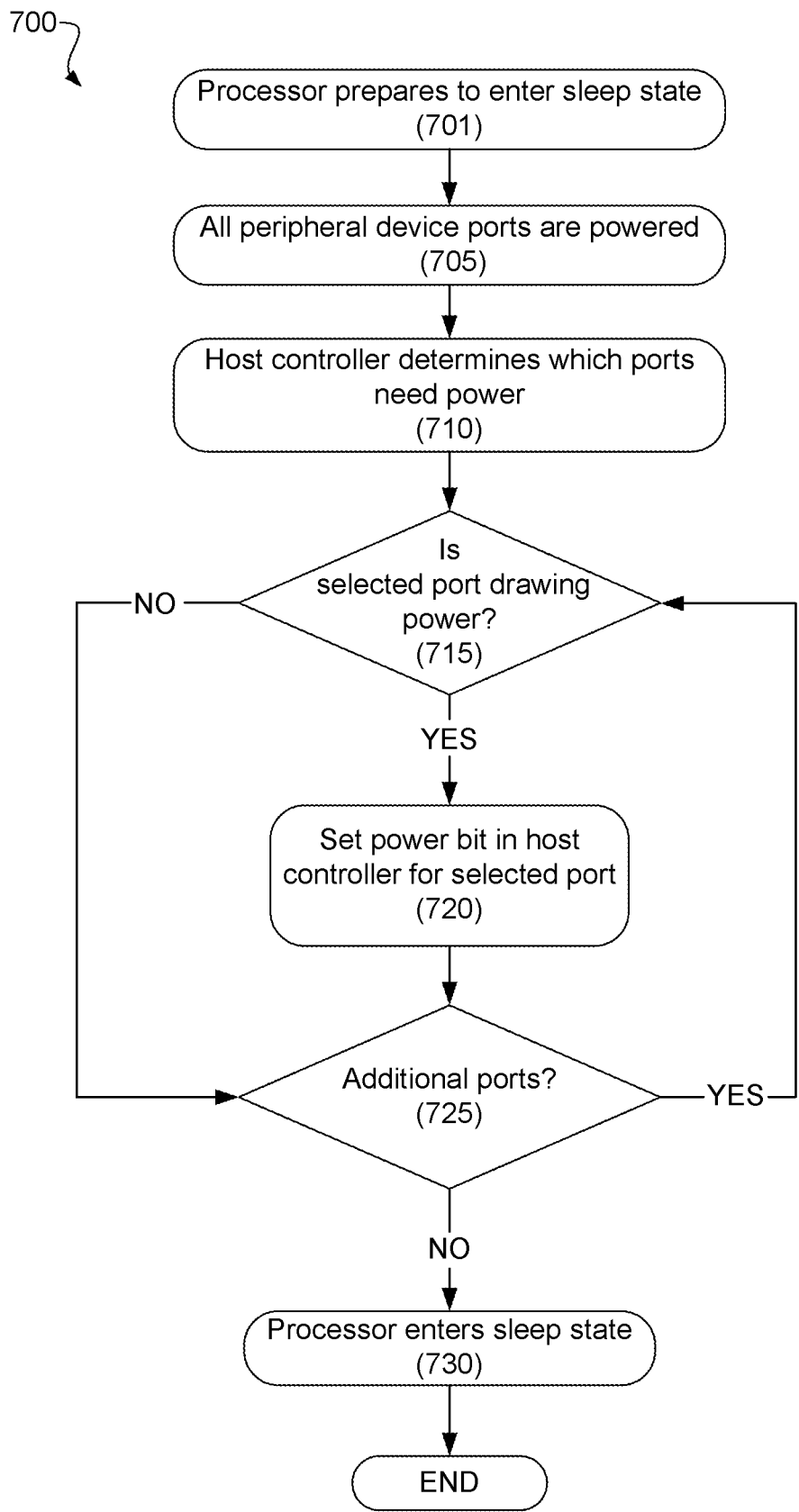
FIG. 7 is a flow diagram of an illustrative method of selectively powering peripheral device ports while a processor is in a sleep state, according to one exemplary embodiment of the principles described herein.

Referring now to FIG. 7, a flow diagram is shown of another illustrative method (700) of selectively powering peripheral device ports when a processor has entered a sleep state. The present method (700) may be performed by, for example, the illustrative computing device (500, FIG. 5) shown in FIG. 5. The present method (700) may be particularly useful in systems where the user-alterable BIOS setting allows for powering of peripheral device ports (410-1 to 410-5) while the processor (401, FIG. 5) is in a sleep state, but does not specify which of the peripheral device ports (410-1 to 410-5, FIG. 5) are to remain powered and/or if any of the peripheral device ports (410-1 to 410-5, FIG. 5) should not be powered during the sleep state of the processor (401, FIG. 5).

In the method (700), as the processor (401, FIG. 5) prepares (step 701) to enter a sleep state, all the peripheral device ports are powered (step 705) so that the peripheral device host controller (508, FIG. 5) may determine (step 710) which of the peripheral device ports (410-1 to 410-5, FIG. 5) are to be powered during the sleep state.

The host controller (508, FIG. 5) may make this determination by progressively or concurrently selecting each peripheral device port (410-1 to 410-5, FIG. 5) and determining (decision 715) if the selected peripheral device port (410-1 to 410-5) is currently drawing power. If so, it may be assumed that a peripheral device (425-1, 425-2, FIG. 5) that requires power is connected to the selected peripheral device port (410-1 to 410-5), and a power bit corresponding to the selected peripheral device port (410-1 to 410-5) may be set (step 720) within the host controller (508, FIG. 5) to ensure that the selected peripheral device port (410-1 to 410-5) remains powered when the processor (401, FIG. 5) enters the sleep state. Once no additional ports remain (decision 725) for selection, the processor (401, FIG. 5) may enter a sleep state (step 730).

In summary, the systems and methods described in the present specification advantageously allow certain peripheral devices which draw power from a host computer system to maintain their power supply while a processor in the host computing device is in a sleep state. By allowing an idle processor to enter the sleep state, power is conserved. Thus, the systems and methods described herein allow for the advantageous selective powering of peripheral devices without requiring that a processor be actively running a resource heavy operating system. This selective powering is controlled by a setting stored in the firmware of the processor which can be selectively altered by a user. As mentioned previously, the systems and methods of the present specification provide especially distinct advantages in computer systems which are portable and run off of battery power such as laptops or notebook computers.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A computing device comprising a processor and at least one peripheral device port; in which the processor:
   powers up a host controller in preparation for the processor to enter a sleep state;
   places the processor in the sleep state after the host controller is powered up; and
   selectively powers the at least one peripheral device port by the host controller when the processor is in the sleep state according to at least one setting stored by the processor.

2. The computing device of claim 1, in which the processor has a plurality of sleep state levels.

3. The computing device of claim 1, in which the processor selectively determines a maximum sleep state for the processor at which power will be provided to the at least one peripheral device port.

4. The computing device of claim 1, in which the processor selectively determines different maximum sleep states at which power will be provided to different peripheral device ports.

5. The computing device of claim 1, in which the processor alters at least one power setting indicating which peripheral device ports are to remain powered when the processor is in the sleep state.

6. The computing device of claim 1, in which the processor:
   powers up the host controller after an operating system has been unloaded from the processor in preparation for the processor to enter the sleep state; and
   specifies to the host controller which of the at least one peripheral device ports are to remain powered when the processor is in the sleep state.

7. The computing device of claim 6, in which the host controller enables power to be provided to each of the at least one peripheral device ports after an operating system has been unloaded from the processor.

8. The computing device of claim 1, in which the host controller maintains a number of data registers to store bits indicating whether a peripheral device port is to remain powered when the processor is in the sleep state.

9. The computing device of claim 1, wherein the processor receives a user input specifying which peripheral device ports are to remain powered while the processor is in the sleep state.

10. The computing device of claim 1, in which each of the at least one peripheral device ports comprises a hardware switch to selectively connect the peripheral device port to a power supply according to the at least one setting.

11. The computing device of claim 10, in which the hardware switch retains a state and switches state when toggled by a general purpose port.

12. A method of powering at least one peripheral device coupled to a processor, comprising:
   storing a user-alterable setting for the processor;
   powering up a host controller in preparation for the processor to enter a sleep state;
   placing the processor in the sleep state after the host controller is powered up; and
   selectively providing power to the at least one peripheral device when the processor is in the sleep state according to the user-alterable setting.

13. The method of claim 12, further comprising allowing a user to specify which of the at least one peripheral device ports are to remain powered when the processor is in the sleep state.

14. The method of claim 12, further comprising:
   allowing a user to specify for which of a first number of sleep states the at least one peripheral device ports are to remain powered; and
   allowing a user to specify for which of a second number of sleep states the at least one peripheral device ports are to be cut off.

15. The method of claim 12, further comprising:
   determining which peripheral device ports are communicatively coupled to an active peripheral device; and
   causing the host controller to provide power while the processor is in the sleep state only to the peripheral device ports that are determined to be communicatively coupled to an active peripheral device.

16. The method of claim 12, in which storing a user-alterable setting for the processor includes setting a port power bit for each peripheral device port, which port power bit indicates whether a peripheral device port is to remain powered when the processor is in the sleep state.

17. A computer program product for powering at least one peripheral device coupled to a processor, the computer program product comprising:
   a non-transitory computer usable medium having computer usable program code embodied therewith, the computer usable program code comprising:
      computer usable program code to store a user-alterable setting;

computer usable program code to power up a host controller in preparation for the processor to enter a sleep state;

computer usable program code to place the processor in the sleep state in response to the host controller being powered up; and computer usable program code to selectively provide power to the at least one peripheral device when the processor is in the sleep state level according to the user-alterable setting.

18. The computer program product of claim 17, in which the computer usable program code further comprises computer usable program code to present to a user via a BIOS menu, a number of settings relating to the powering up of peripheral device ports when the processor is in the sleep state level.

19. The computer program product of claim 17, in which the computer usable program code to selectively provide power to the at least one peripheral device when the processor is in the sleep state level according to the user alterable setting comprises computer usable program code to read a port power bit to determine whether a peripheral device port is to be powered when the processor is in the sleep state level.

20. The computer program product of claim 17, in which the user-alterable setting specifies different maximum sleep state levels at which power will be provided to different peripheral device ports.

* * * * *